(12) United States Patent
Babazadeh (10) Patent No.: US 10,958,170 B2
(45) Date of Patent: Mar. 23, 2021

(54) FAST TRANSIENT RESPONSE IN DC-TO-DC CONVERTERS

(71) Applicant: Alpha and Omega Semiconductor (Cayman) Ltd., Grand Cayman (KY)

(72) Inventor: Amir Babazadeh, Laguna Hills, CA (US)

(73) Assignee: ALPHA AND OMEGA SEMICONDUCTOR (CAYMAN) LTD., Grand Cayman (KY)

( * ) Notice: Subject to any disclaimer, the term of this patent is extended or adjusted under 35 U.S.C. 154(b) by 0 days.

(21) Appl. No.: 16/366,554

(22) Filed: Mar. 27, 2019

(65) Prior Publication Data
US 2020/0313552 A1 Oct. 1, 2020

(51) Int. Cl.
*H02M 3/157* (2006.01)
*H02M 3/16* (2006.01)
*H02M 1/00* (2006.01)

(52) U.S. Cl.
CPC ............ *H02M 3/157* (2013.01); *H02M 3/16* (2013.01); *H02M 2001/0009* (2013.01)

(58) Field of Classification Search
CPC ................... H02M 3/157; H02M 3/16; H02M 2001/0009; H02M 1/00
See application file for complete search history.

(56) References Cited

U.S. PATENT DOCUMENTS

| | | | |
|---|---|---|---|
| 2002/0171985 A1* | 11/2002 | Duffy | G06F 1/305 361/90 |
| 2006/0152204 A1* | 7/2006 | Maksimovic | H02M 1/38 323/284 |
| 2009/0174262 A1* | 7/2009 | Martin | H02M 3/157 307/82 |
| 2017/0138292 A1* | 5/2017 | Schweikert | F02D 41/26 |
| 2019/0058394 A1* | 2/2019 | Neidorff | H02M 3/158 |

OTHER PUBLICATIONS

Amir Babazadeh et al., "Hybrid Digital Adaptive Control for Fast Transient Response in Synchronous Buck DC-DC converters" in IEEE Transactions on Power Electronics, vol. 24, No. 11, Nov. 2009 pp. 2625-2638.
Marian K. Kazimierczuk, "Pulse-Width Modulated DC-DC Power Converters", Chapter 2, "Buck PWM DC-DC Converter", pp. 22-89, 2nd Edition, Wiley, 2015.

(Continued)

*Primary Examiner* — Jue Zhang
*Assistant Examiner* — Trinh Q Dang
(74) *Attorney, Agent, or Firm* — JDI Patent; Joshua Isenberg; Robert Pullman (57) ABSTRACT

A computer program product and DC-to-DC converter comprising, an electronic switching device, an inductor coupled to the electronic switching device, a capacitor coupled to the inductor wherein the inductor and capacitor are chosen such that the resistance of the load line is greater than a gain minus the equivalent series resistance. A transient controller is communicatively coupled to the electronic switching device, wherein the transient controller has adaptive voltage positioning and wherein the transient controller sends a signal configured to initiate discharging the capacitor during a transient event.

17 Claims, 12 Drawing Sheets

(56) References Cited

OTHER PUBLICATIONS

Robert W. Erickson, "DC-DC Power Converters", Article in Wiley Encyclopedia of Electrical and Electronics Engineering, Mar. 1999, John Wiley & Sons, Inc., New York, NY.

Taylor Craig Yeago, Master's Thesis, A Two-Phase Buck Converter With Optimum Phase Selection for Low Power Applications, the Virginia Polytechnic Institute and State University, Blacksburg, VA, Dec. 10, 2014.

Vahid Yousefzadeh, et a., "Proximate Time-Optimal Digital Control for Synchronous Buck DC-DC Converters" in IEEE Transactions on Power Electronics, vol. 23, No. 4, Jul. 2008, pp. 2018-2026.

U.S. Appl. No. 17/146,248 to Amir Babazadeh filed Jan. 11, 2021.

\* cited by examiner

FIG. 1

(Prior Art)

PWM

FIG. 10

FAST TRANSIENT RESPONSE IN DC-TO-DC CONVERTERS

FIELD OF THE INVENTION

Aspects of the present disclosure are related to DC-to-DC converters. Specifically aspects of the present disclosure relate to DC-to-DC converters with Active Voltage Positioning (AVP).

BACKGROUND OF THE INVENTION

As microprocessors grow more complex over time and pack an increasing number of circuits, the power supplies are subject to more stringent performance requirements, especially for load transients.

Key factors to measure the performance in DC-DC power converters for transient response are overshoot/undershoot, uniform shape and recovery or settling time. These factors are especially important in high-end applications such as CPUs, GPUs and telecommunication systems The problem of fast transient response, which results in output capacitor savings, has been extensively investigated for cases where the target voltage ($V_{ref}$) does not move with the load current. However, adaptive voltage positioning (AVP) where the target voltage moves with the load current ($V_{ref}-I_{load}*R_{LL}$ where $R_{LL}$ is called load line) and allows for greater flexibility in circuit design with less need for filter capacitors.

In the past, attempts to meet the load transient specifications have taken several different approaches but the systems and the controllers have never been optimized specifically for the presence of the load line. One approach is to add more filter (output) capacitors to the solution, which increases the size and cost and may create a ring back in the voltage response while controlling the undershoot. Another approach is to apply complex nonlinear control methods like time optimal control, which are originally designed for systems with no AVP and no movement of the target voltage based on the load current, on systems with load line. These complex, nonlinear approaches are mostly based on the voltage error (Vref−Vo) and do not take into account the load line for achieving the optimum response.

Currently, the majority of the controllers used in this field are error based, meaning once the error (Vref−Vo) is larger than a predefined threshold, they start supplying more energy to the output capacitor. This approach however may cause ring back (non-uniform voltage shape) and none have optimal transient response in the systems with AVP.

BRIEF DESCRIPTION OF THE DRAWINGS

The teachings of the present disclosure can be readily understood by considering the following detailed description in conjunction with the accompanying drawings, in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

In the interest of clarity, not all of the routine features of the implementations described herein are shown and described. It will be understood by those skilled in the art that in the development of any such implementations, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of the present disclosure.

Introduction

Non-optimal transient response in DC-DC power converters with load line may cause larger voltage undershoot/overshoot, non-uniform voltage shape (known as ring back), and longer settling times which all degrade the transient performance of the system. As an example, the non-uniform voltage shape has direct impact on the transient performance when the system is under high frequency dynamic load changes. To address this specific issue there is a need for a nonlinear control mechanism to detect the high frequency event and then modify it in order to meet the necessary specifications. Conventional solutions require a lot of hardware and increase the area and cost on the chip.

The commonly used controllers are not designed to specifically generate the optimal transient response in converters with load line. One reason is that the load line is not usually taken into account in control design for obtaining the optimum transient response. This disclosure will discuss a controller designed for handling fast transient responses in systems with a load line.

DC-to-DC Converter Layout

Figure 1:
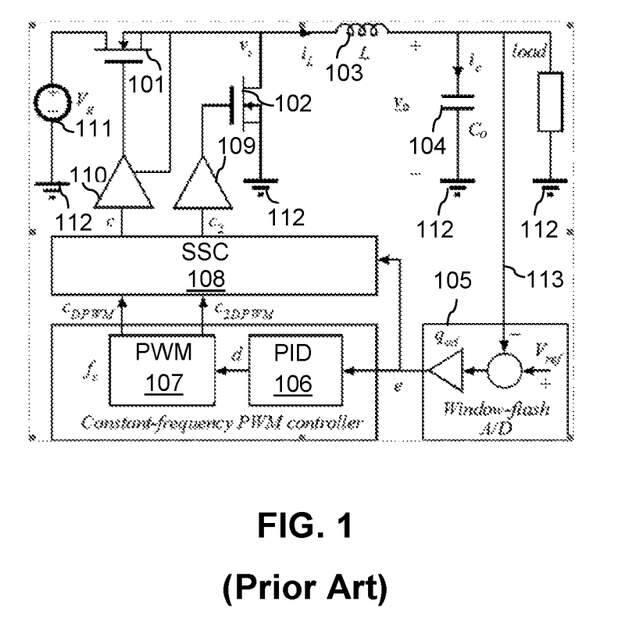
FIG. 1 is a circuit diagram of a prior art DC-to-DC converter without adaptive voltage positioning and transient control.

FIG. 1 shows a DC-to-DC converter without adaptive voltage positioning (AVP) or load line. The components of this DC-to-DC converter without adaptive voltage positioning are a high side switch 01, low side switch 102, inductor 103, capacitor 104, error voltage computation 105, Proportional-Integral-Derivative (PID) controller 106, Pulse Width Modulated (PWM) controller 107, Switching Surface controller (SSC) 108, high side driver 110, and a low side driver 109.

The low side switch 102 may be replaced with a diode. By way of example, and not by way of limitation each of the switches 101, 102 are electronic switching devices and may be transistors such as a field effect transistor (FET), e.g., a metal oxide semiconductor FET (MOSFET). In this arrangement, the high side switch 101 is conductively coupled to the voltage source 111. The inductor 103 is conductively coupled to both the high side switch 101 and the low side switch 102. The low side switch 102 is conductively coupled to a ground rail. The inductor 103 is conductively coupled to the capacitor 104 and the load. The load is connected parallel to the capacitor 104. The other side of the capacitor 104 is connected to the ground rail 112. A voltage sense lead 113 is also conductively coupled to the inductor 103 after the capacitor 104 and in parallel with the capacitor and a load. The error voltage computation takes the input of a reference or target voltage ($V_{ref}$) and the voltage on the voltage sense lead 113. The error voltage computation subtracts the voltage on the sense lead from the from the reference voltage and provides that voltage difference (also known as the error voltage, e) to the PID 106 and the Switching Surface Controller (SSC) 108 through a conductive coupling. The PID 106 is conductively coupled to the PWM 107 and provides the duty cycle signal (d) to drive the PWM module. The PWM module 107 generates digital pulse width modulated control signals ($c_{DPWM}$, $c_{2DPWM}$) and provides them the SSC 108 through a conductive coupling.

The SSC 108 either passes the control signals to the switch drivers 110, 109, or enforces an on state or an off state for the switches depending on the error voltage and a current estimate exceeding a threshold. Further information about the operation of the supervisor can be found in Yousefzadeh, Vahid et al *"Proximate Time-Optimal Digital Control for Synchronous Buck DC-DC converters"* IEEE Transactions on Power Electronics, V. 23, No. 4 (July 2008) which is incorporated herein by reference for all purposes.

Drivers 109, 110 take control signals c, $c_2$ and amplify them before passing the signals to the relevant control terminals (e.g., base for bipolar or gate for FET) of the high side 101 and low side 102 switches through conductive couplings.

It should be noted that, on converter designs that implement a diode for the low side, no driver is needed. Additionally, a conductive coupling may be any surface that provides an electrically conductive connection between the parts. For example, a conductive coupling may be a wire, a conductive trace on a surface, a conductive rail, or some other type conductive connection between the two objects being coupled. Similarly, a communicative coupling may be any connection that conveys information between the components being coupled. A component may be communicatively coupled with another component even when a third component acts on the information as long as the information being conveyed results in substantially the same desired result.

Figure 2A:
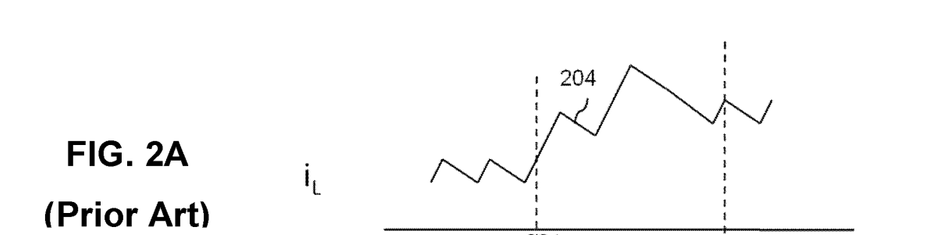
FIG. 2A is a graph of load current vs time for a prior art DC-to-DC converter without adaptive voltage positioning and transient control.
Figure 2B:
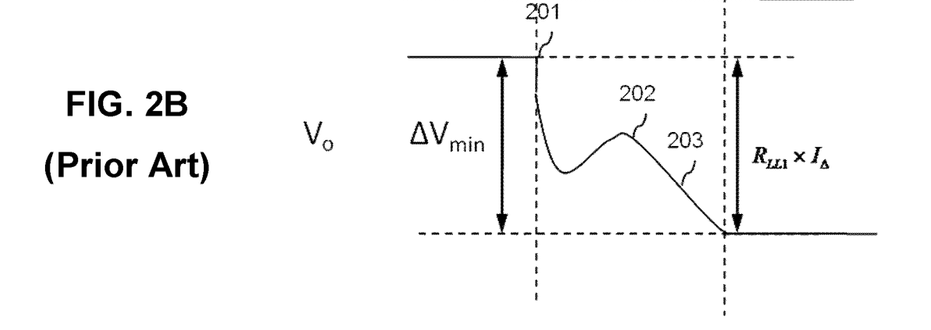
FIG. 2B is a graph of the voltage across the capacitor $V_o$ vs time for a prior art DC-to-DC converter without load line and transient control.
Figure 3:
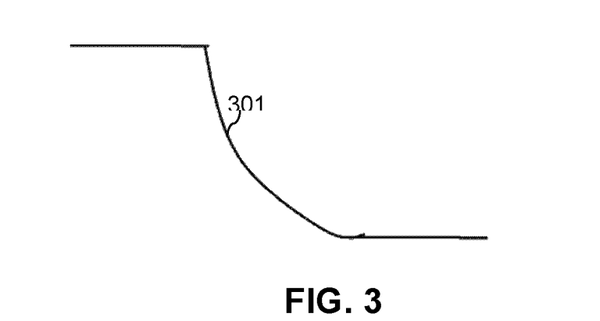
FIG. 3 is a graph of voltage from the capacitor versus time showing an ideal response for DC-to-DC converter during a transient.

FIG. 2 shows a typical function of the DC-to-DC converter with AVP while the control is optimized for the no load line case. An initial drop in voltage 201 causes the DC-to-DC converter to apply wide PWM pulses and turns on the high side switch and transfer energy into the system more than needed. This extra energy will result in an increase in current 204 and cause voltage ring back 202. This sudden rise in the voltage 202 is the ring back and the after effect is a long lag time 203 before the transient settles at the final set point. FIG. 3 shows the ideal voltage response to a transient for a DC-to-DC converter in a system with load line according to aspects of the present disclosure. As shown, the voltage would fall the new target value in a smooth fashion 301 and in much shorter time.

DC-to-DC Converter with Adaptive Voltage Positioning

Figure 4:
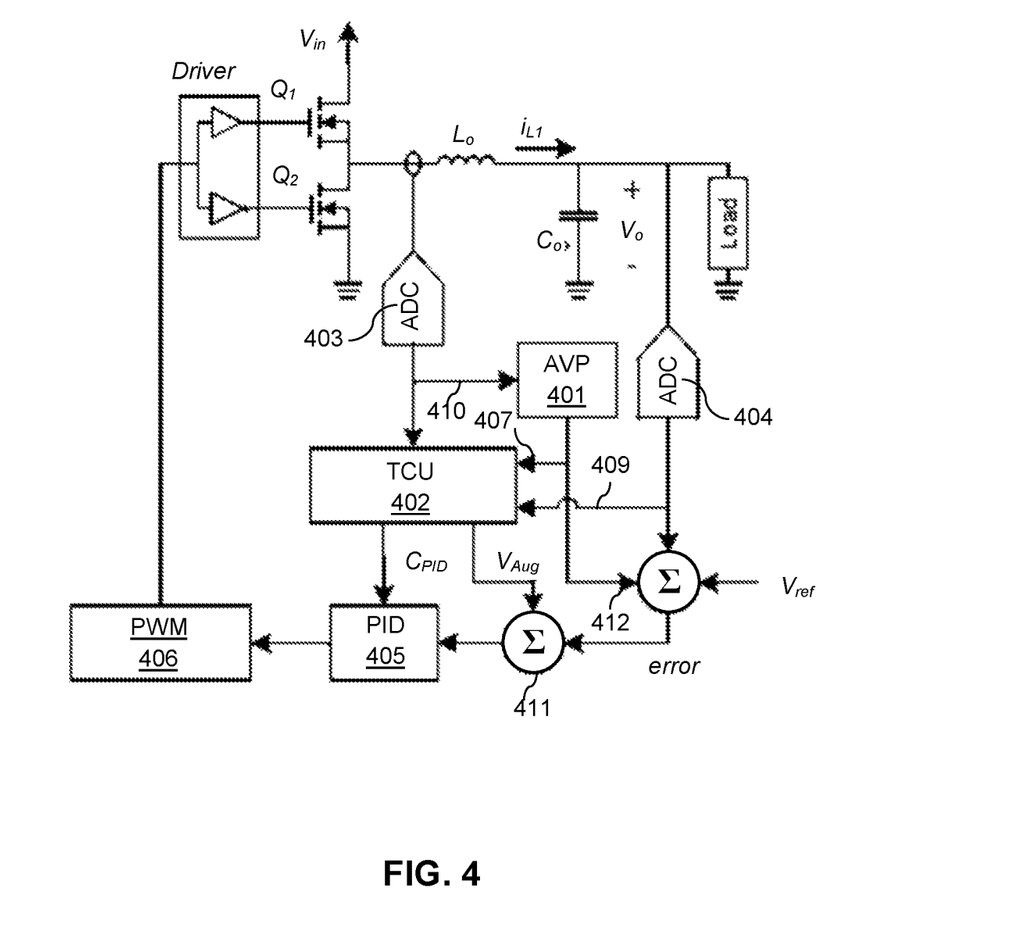
FIG. 4 shows a circuit diagram showing a DC-to-DC converter with load line and a transient controller coupled to a proportional-integral-derivative (PID) controller and an error voltage according to aspects of the present disclosure.

According to aspects of the present disclosure, the ring back and long lag time can be resolved with the addition of a Transient Controller Unit or Transient Controller (TCU). TCU also results in near time optimal response, which minimizes the amount of the output capacitor requirement. FIG. 4 depicts an embodiment of the present disclosure that has a TCU 402 coupled 407 to the AVP 401 and the PID 405. The TCU 402 receives phase current samples from an analog to digital converter (ADC) 403. The output of the ADC 403 is also coupled 410 to the AVP block 401. The AVP is responsible for adjusting the output voltage level based on the load current. The TCU 402 additionally may be coupled to the output of the inductor 409 transduced through an ADC 404. Similarly, the ADC 404 transduces the error voltage provided to the PID 405. The TCU 402 may be coupled to and provide control inputs ($C_{PID}$) to the PID 405. In some embodiments, these control inputs may modify the gain of the PID 405 in other embodiments the control inputs adjust other parameters of the controller. The TCU 402 may also be coupled to the voltage error line (error). In some embodiments, the TCU 402 may control the PID 405 by modifying the voltage error 411 before it is received by the PID 405. In some additional embodiments, the TCU provides both a $C_{PID}$ and modifies the error voltage to control the operation of the PID 405. During operation in the PID provides signals to the PWM 406. The PWM 406 may provide appropriate signals to the driver and subsequently the switches Q1, Q2. The signals provided by the PID may communicate a response generated by the TCU. The TCU may send signals to the PID to control the operation of the DC-to-DC converter with load line during a transient event. As will be discussed in a later section, these signals may be configured to initiate discharging of the capacitor in certain transient events.

Figure 5:
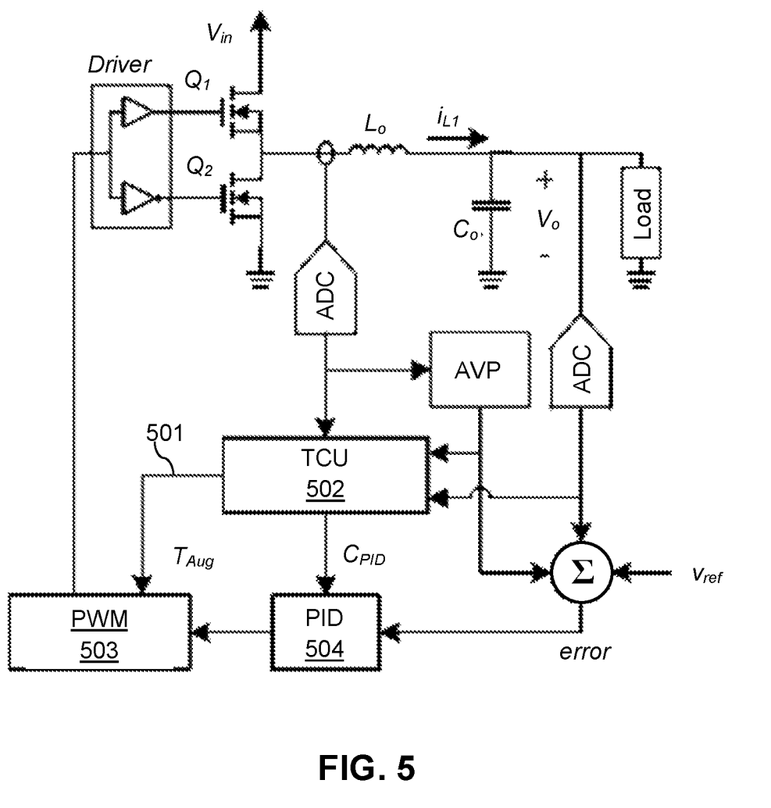
FIG. 5 shows a circuit diagram showing a DC-to-DC converter with load line a transient controller coupled to a PID and a pulse width modulation (PWM) controller according to aspects of the present disclosure.

FIG. 5 shows another embodiment of the DC-to-DC converter with load line according to aspects of the present disclosure. In this embodiment, the TCU 502 is coupled 501 to the PWM 503. The TCU 502 may send timing augmenting controls ($T_{aug}$) to the PWM 503 to alter the function of the PWM and subsequently the function of the device during a transient event. Additionally, the TCU 502 may be coupled to the PID 504. The TCU 502 may control PID 504 with the $C_{PID}$ signal to alter the operation of the PID during a transient event. This subsequently alters the operation of the DC-to-DC converter during the transient event.

Figure 6:
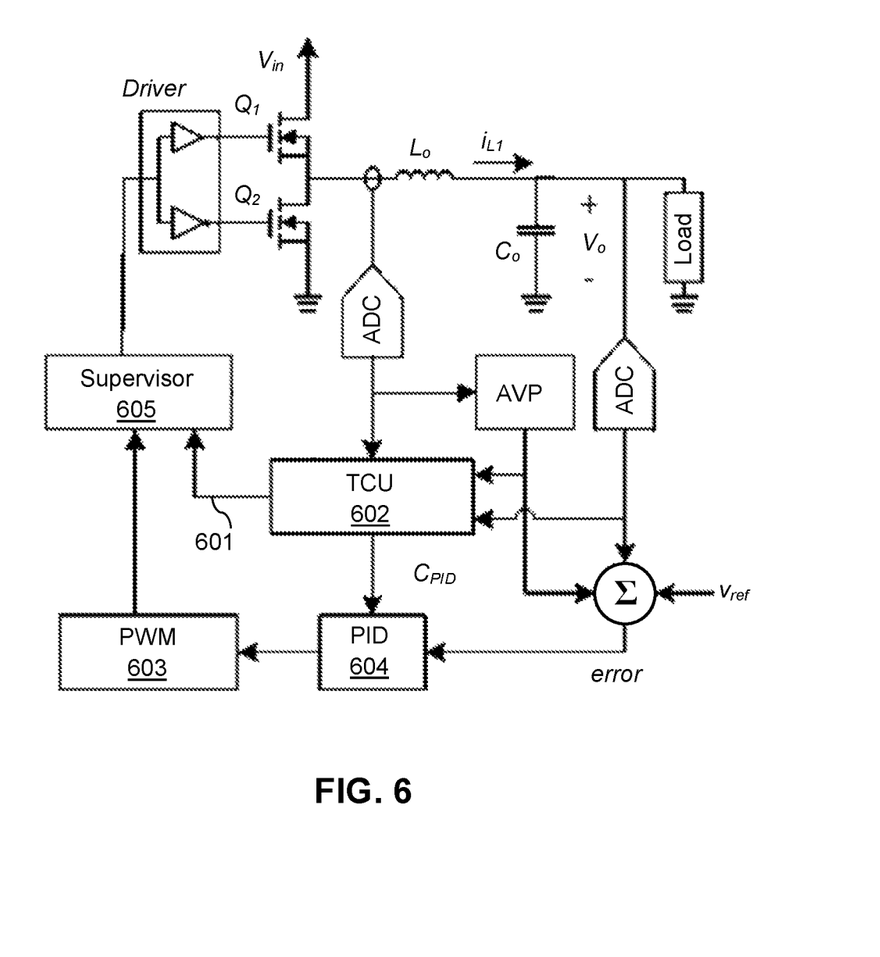
FIG. 6 shows a circuit diagram showing a DC-to-DC converter with load line and a transient controller coupled to a PID and a Supervisor according to aspects of the present disclosure.

FIG. 6 shows yet another embodiment of the DC-to-DC converter with load line according to aspects of the present disclosure. Here, the DC-to-DC converter includes a Supervisor 605. The TCU 602 is configured to send control signals 601 to the Supervisor 605 during a transient event. The Supervisor 605 is configured to be controlled by the TCU 602 during a transient event and then change back to normal operation after the transient has ended. Additionally, in some embodiments, the TCU 602 may be coupled to the PID 604 and send signals to the PID 604. Those signals may alter the operation of the PID 604 and subsequently the operation of the device during a transient event.

Figure 9A:
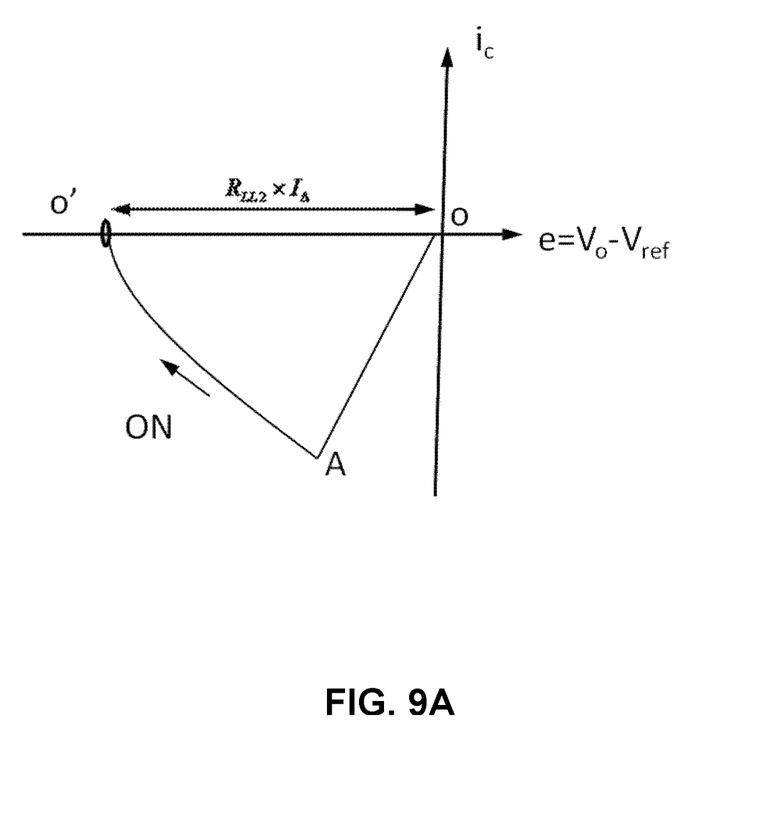
FIG. 9A depicts a Switching Surface Curve graph showing the operation of an optimized DC-to-DC converter with load line and transient controller that adjusts the load line resistance according to aspects of the present disclosure
Figure 9B:
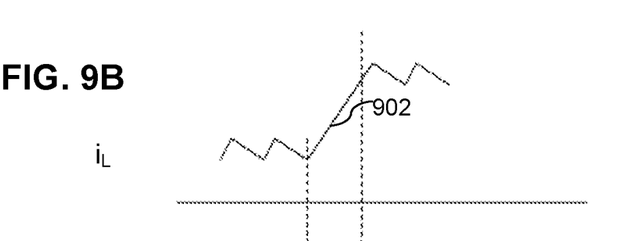
FIG. 9B is a graph of load current vs time showing the operation of an optimized DC-to-DC converter with load line and transient controller that adjusts the load line resistance according to aspects of the present disclosure.
Figure 9C:
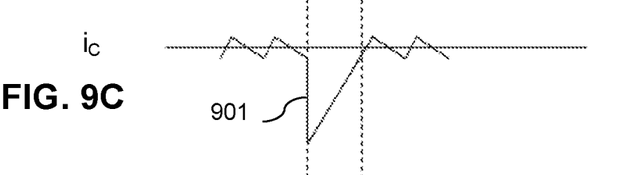
FIG. 9C is a graph of current from the capacitor versus time showing the operation of an optimized DC-to-DC converter with load line and transient controller that adjusts the load line resistance according to aspects of the present disclosure.
Figure 9D:
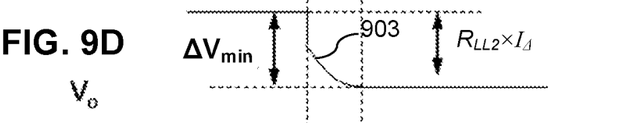
FIG. 9D is a graph of voltage from the capacitor versus time showing the operation of an optimized DC-to-DC converter with load line and transient controller that adjusts the load line resistance according to aspects of the present disclosure.
Figure 9E:
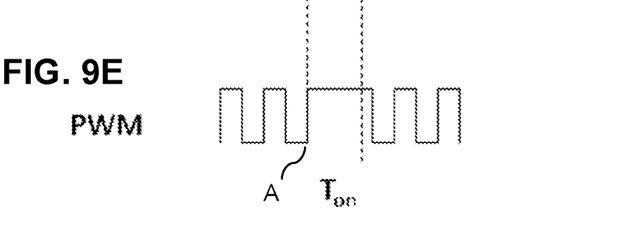
FIG. 9E is a graph of pulse width modulated signal versus time showing the operation of an optimized DC-to-DC converter with load line and transient controller that adjusts the load line resistance according to aspects of the present disclosure.
Figure 10:
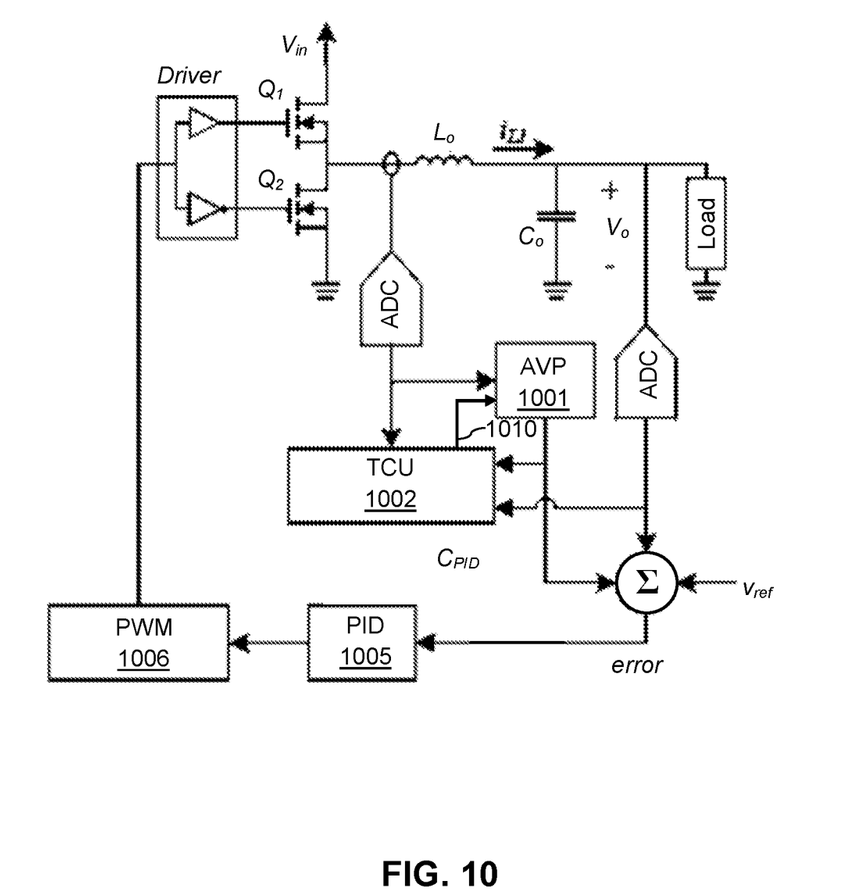
FIG. 10 shows a circuit diagram showing for a DC-to-DC converter with load line and a transient controller coupled to an AVP device according to aspects of the present disclosure

FIG. 10 shows an alternative embodiment of the present disclosure wherein the DC-to-DC converter modifies the operation of the AVP. In this embodiment, the TCU 1002 is coupled 1010 to the AVP 1001. The TCU 1002 sends signals to the AVP 1001 that are configured to modify the load line value ($R_{LL}$). By way of example, and not by way of limitation, the TCU 1002 may send a signal to adjust the load line value ($R_{LL}$) for controlling the transient response. Alternatively, the signal sent by the TCU may set the value of $R_{LL}$ for use by the AVP 1001. Consequently, the AVP 1001 may apply a weight to the reference voltage, which is subsequently used by the PID 1005 and the PWM 1006. As such, the signal sent by the TCU alters the operation of each of these units in response to a transient. As discussed below with respect to FIGS. 9A-E the signal sent by the TCU may change the $R_{LL}$ to achieve optimal switching conditions.

Operation of the DC-to-DC Converter with Adaptive Voltage Positioning

Figure 7A:
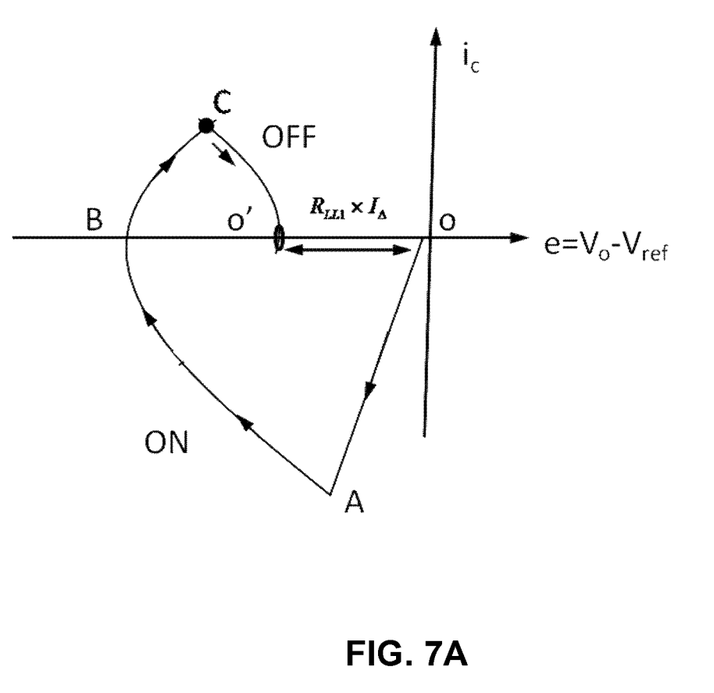
FIG. 7A depicts a Switching Surface Curve graph showing the operation of a non-optimized DC-to-DC converter with load line.

FIG. 7A is a switching surface graph showing the minimum time optimal response or the fastest transient with minimum undershoot in a DC-to-DC converter with AVP. The X-axis represents the error voltage ($e=V_O-V_{ref}$) and the Y-axis represents the current from the capacitor ($i_c$). The Arrow shows the change over time. Here, the DC-to-DC converter design is such that the load line $R_{LL}$ (a gain which is expressed as a resistance) is roughly less than the gain ($R_C$) of the converter minus an equivalent series resistance ($R_{ESR}$) where $R_C$ is given by:

$$I_\Delta/(2(V_{in}-V_O)\times(C_o/L)) \qquad (EQ. 1)$$

Figure 7B:
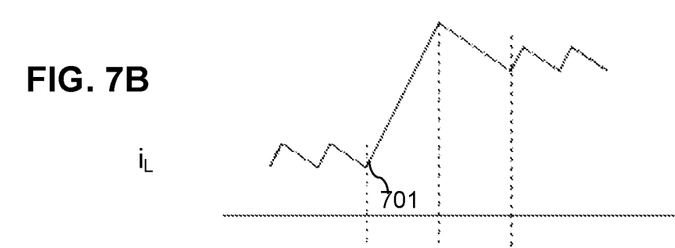
FIG. 7B is a graph of load current vs time showing the operation of a non-optimized DC-to-DC converter with load line

In EQ. 1, $I_\Delta$ is the change amplitude of the load current with respect to time, $C_o$ is the filter capacitance or the output capacitor, $V_{in}$ is the input voltage, $V_O$ is the output voltage and L is the inductor value. Thus for the converter in 7A and 7B the ratio of the capacitor size to the inductor size for a given load transient $I_\Delta$ results in:

$$R_{LL}<I_\Delta/(2(V_{in}-V_O)\times(C_o/L))-R_{ESR} \qquad (EQ 2)$$

Figure 7C:
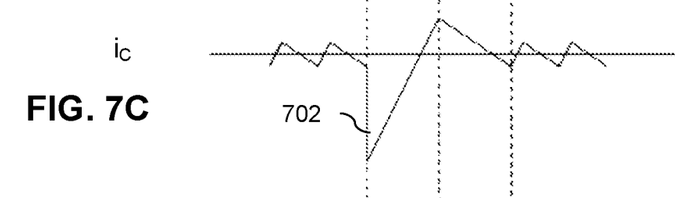
FIG. 7C is a graph of current from the capacitor versus time showing the operation of a non-optimized DC-to-DC converter with load line.
Figure 7D:
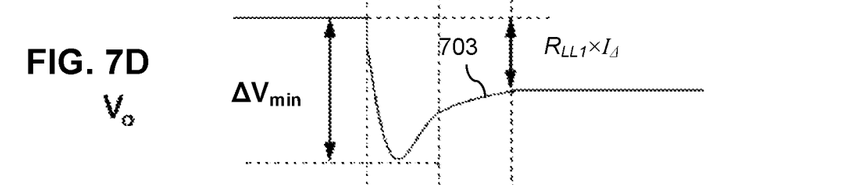
FIG. 7D is a graph of voltage from the capacitor versus time showing the operation of a non-optimized DC-to-DC converter with load line
Figure 7E:
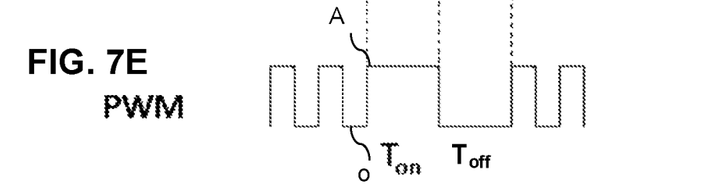
FIG. 7E is a graph of pulse width modulated signal versus time showing the operation of a non-optimized DC-to-DC converter with load line.

In this case the as shown in FIG. 7A-7E the design of the DC-to-DC converter results in a voltage undershoot which happens at point B in FIG. 7A, the converter starts in an initial origin state (o) with around 0 error and as shown in the FIG. 7B a sudden rise in the load current moves the trajectory to A. This rise in current draw from the load causes a drop in the in the current from the capacitor 702 as shown in FIGS. 7C and 7A. Similarly, the drop in current from the capacitors 702 results in a drop in voltage as shown in FIG. 7D. Once the drop in the voltage is detected, the DC-to-DC converter turns on the high side switch. This switching on the high side causes the inductor current 701 to ramp up. For achieving the fastest transient response with the minimum undershoot, the trajectory needs to cross the X-Axis at point B, which is equivalent to the undershoot, before reaching the target voltage point (o'). The controller turns off the high side switch at point C to reach the target voltage (o') in a single cycle. This response is indeed the fastest response with minimum possible undershoot however due to the system parameters the undershoot is inevitable. In other words the voltage response will have always undershoot unless the load line value or ($C_o/L$) according to EQ2 is redesigned.

FIGS. 8A-8E show the operation a DC-to-DC converter with AVP according to aspects of the present disclosure. In some embodiments of the DC-to-DC converter with adaptive voltage positioning according to aspects of the present disclosure the inductance and the capacitance are chosen such that the combination of the components in the DC-to-DC converter and the load satisfies the constraint for a given load transient ($I_A$):

$$R_{LL} > I_A/(2(V_{in}-V_O) \times (C_o/L)) - R_{ESR} \quad (EQ. 3)$$

Figure 8A:
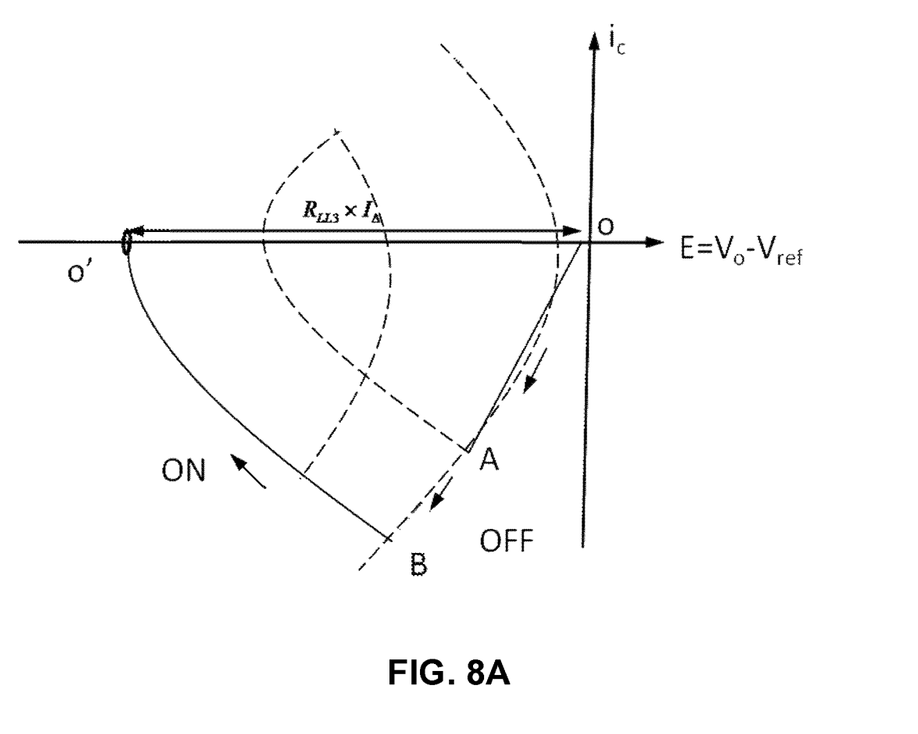
FIG. 8A depicts a Switching Surface Curve graph showing the operation of an optimized DC-to-DC converter with load line and transient controller according to aspects of the present disclosure.
Figure 8B:
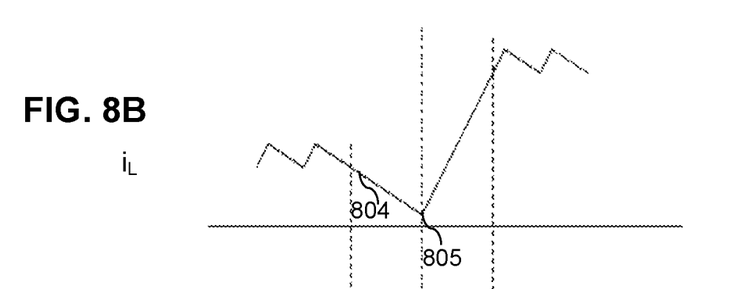
FIG. 8B is a graph of load current versus time showing the operation of an optimized DC-to-DC converter with load line and transient controller according to aspects of the present disclosure.
Figure 8C:
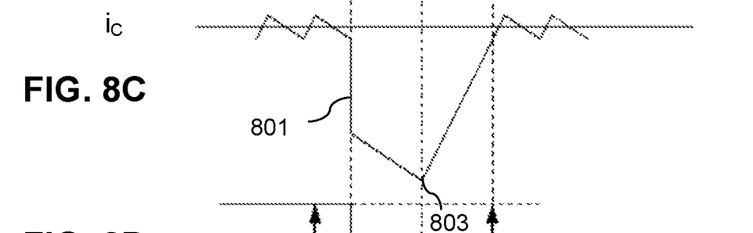
FIG. 8C is a graph of current from the capacitor versus time showing the operation of an optimized DC-to-DC converter with load line and transient controller according to aspects of the present disclosure.
Figure 8D:
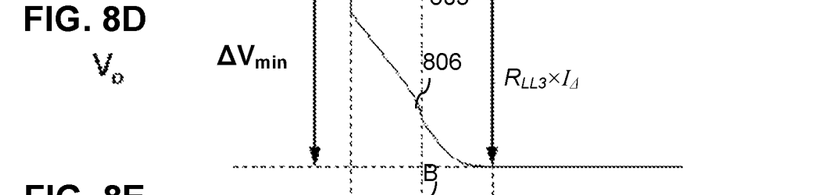
FIG. 8D is a graph of voltage from the capacitor versus time showing the operation of an optimized DC-to-DC converter with load line and transient controller according to aspects of the present disclosure.
Figure 8E:
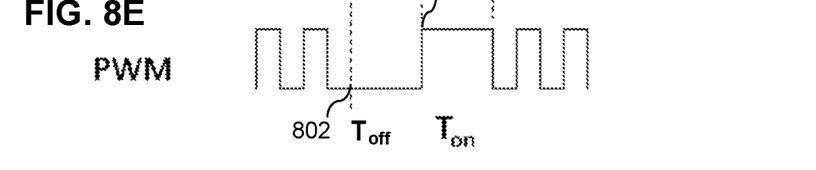
FIG. 8E is a graph of pulse width modulated signal versus time showing the operation of an optimized DC-to-DC converter with load line and transient controller according to aspects of the present disclosure.

This design ensures that the operation of the DC-to-DC converter will follow the switching surface shown in FIG. 8A. Specifically, the DC-to-DC converter starts at an initial low error state (o). A transient occurs causing a drop in the output voltage across the capacitor 801. In a typical device as discussed above detecting this drop would cause the device to switch the high side switch on at point A to compensate for the transient. The device would then follow the dotted curve 810 with an initial undershoot and then overshoot before reaching the optimal point (o') which will result in ring back and a longer recovery time. It should be noted that the optimal point o' is also 0 voltage error due to the change in the target voltage due to AVP ($R_{LL}*I_A$). Operation in accordance with aspects of the present disclosure counterintuitively allow the capacitor to discharge to a point where ring back is eliminated before switching on the high side switch. As shown in FIG. 8E, the Pulse Width Modulated signal to the high side switch is in the off state when the transient occurs 802. Instead of immediately sending an "on" signal, as done in typical DC-to-DC converters, the optimal DC-to-DC converter with AVP does not switch on the high side switch until the capacitor is sufficiently discharged (B) as shown in FIGS. 8A and 8E. In some cases, the high side switch may be "on" at the start of a transient, in these cases the high side switch is turned "off" until the capacitor is sufficiently discharged. Once the high side switch is "on", the current through the capacitor begins to rise 803 and the voltage drops 806 smoothly to the new nominal value without ring back. The switching surface curve graph, FIG. 8A shows that after switching at point B, the trajectory of the capacitor current and voltage error follows the solid curve and the DC-to-DC converter attains the optimal error voltage level (o'). Given that this trajectory is an optimal response, any controllers able to follow this trajectory, even roughly, will in fact be near optimal control. Thus, the DC-to-DC converter with adaptive voltage positioning can attain near optimal performance reliably with inductors and capacitors specifically chosen to satisfy EQ. 3 and a TCU configured to implement the above-described operation.

In accordance with aspects of the present disclosure, the TCU in communication with other elements of the DC-to-DC converter modifies the operation of the DC-to-DC converter in response to a transient event as discussed above. For example, the TCU may send a signal configured to initiate discharging the capacitor of the DC-to-DC converter during a transient event so that the DC-to-DC converter behaves in the manner described by FIGS. 8A-8E. A device lacking the TCU would not perform optimally in a transient event with components chosen to satisfy EQ. 3. Operation without the TCU would follow the dotted curve 810, resulting in a voltage overshoot and ring back.

FIGS. 9A-9E illustrate an example of operation a DC-to-DC converter with adaptive voltage positioning and optimal design. In this case, the components of the DC-to-DC converter are chosen and variables are configured to meet the constraint:

$$R_{LL} = I_A/(2(V_{in}-V_O) \times (C_o/L)) - R_{ESR} \quad (EQ. 4)$$

Ordinarily, there is only a narrow window in which a DC-to-DC converter would satisfy EQ. 4 because both the current change with respect to time and the difference between the voltage in and voltage out are variable and change during operation. According to aspects of the present disclosure the TCU may be configured to change the value of $R_{LL}$ using the AVP during operation so that the DC-to-DC converter always meets the constraint of EQ. 4 during a transient thus allowing the DC-to-DC converter to respond to a transient as shown in FIGS. 9A-9E.

FIG. 9A depicts the switching surface graph of a device which satisfies EQ. 4. During a transient, the current from the capacitors falls 901 as shown in FIG. 9C. The falling voltage 903 is detected and the device turns on the high side switch A as seen in FIGS. 9A and 9E. This causes a rise in current to the load 902 and a smooth drop voltage without ring back 903 as shown in FIGS. 9B and 9D. The TCU continually monitors the load line level and the system gain. Specifically the TCU is configured to adjust the load line value based on the inductor current or capacitor current or output voltage to be able to control the transient response. The TCU adjusts the load line resistance so that the device will always meet the constraint of EQ. 4 and as such once the trajectory of the capacitor current and voltage error reaches point O' both the capacitor current and voltage error are at their steady state point and the transient has finished without a ring back effect.

In some embodiments of the present disclosure to implement the controls the TCU may have a look up table containing the appropriate inductor current, or estimated capacitor current, or actual measured capacitor current and error voltage levels to turn on the high side switch. Additionally, the table may prescribe different responses for different cases, for example changing the error voltage in one case and exerting control on the PID in a second different case. In alternative embodiments, the TCU may have a switching surface curve like the one in FIG. 8A and implement command control based on the curve data.

In accordance with aspects of the present disclosure, the components, process steps, and/or data structures may be implemented using various types of operating systems; computing platforms; user interfaces/displays, including personal or laptop computers, video game consoles, PDAs and other handheld devices, such as cellular telephones, tablet computers, portable gaming devices; and/or general-purpose machines. In addition, those of ordinary skill in the art will recognize that devices of a less general-purpose nature, such as hardwired devices, field programmable gate arrays (FOGs), application specific integrated circuits (ASICs), or the like, may also be used without departing from the scope and spirit of the inventive concepts disclosed herein.

While the above is a complete description of the preferred embodiments of the present invention, it is possible to use various alternatives, modifications, and equivalents. Therefore, the scope of the present invention should be determined not with reference to the above description but should, instead, be determined with reference to the appended claims, along with their full scope of equivalents. Any feature, whether preferred or not, may be combined with any other feature, whether preferred or not. In the claims that follow, the indefinite article "A" or "An" refers to a quantity of one or more of the item following the article, except where expressly stated otherwise. The appended claims are not to be interpreted as including means-plus-function limitations, unless such a limitation is explicitly recited in a given claim using the phrase "means for". Any element in a claim that does not explicitly state "means for" performing a specified function, is not to be interpreted as a "means" or "step" clause as specified in 35 USC § 112, ¶6.

What is claimed is:

1. A DC-to-DC converter comprising;
an electronic switching device having a high side switch and a low side switch;
an inductor coupled to the electronic switching device;
a capacitor coupled to the inductor;
a transient controller unit (TCU) communicatively coupled to the electronic switching device; and,
an adaptive voltage positioning (AVP) block coupled to the TCU, wherein the AVP block and TCU are configured to discharge the capacitor to a point where ring back in an output voltage across the capacitor is eliminated in response to a transient event before turning on the high side switch and wherein the adaptive voltage positioning block is configured to vary an output voltage with a change in a load current.

2. The DC-to-DC converter of claim 1 wherein the gain is a change in current divided by two times a weighted capacitance wherein the weighted capacitance is the capacitance multiplied by a voltage into the electronic switching device minus a voltage out of the capacitor divided by the inductance of the inductor.

3. The DC-to-DC converter of claim 1 wherein the TCU sends a signal configured to turn on the electronic switching device after the capacitor has been sufficiently discharged.

4. The DC-to-DC converter of claim 1 further comprising a proportion-integral-derivative controller (PID) communicatively coupled to the electronic switching device, wherein the TCU is communicatively coupled to the PID.

5. The DC-to-DC converter of claim 1 wherein the TCU uses a switching surface curve to determine the signal to send.

6. The DC-to-DC converter of claim 1, wherein the high side and low side switching devices are transistors.

7. The DC-to-DC converter of claim 4 wherein the signal sent by the TCU is configured to modify an error voltage used by the PID.

8. The DC-to-DC converter of claim 4 wherein the TCU is configured to control the operation of the PID.

9. The DC-to-DC converter of claim 4 further comprising a Pulse Width Modulated signal generator (PWM) communicatively coupled to the electronic switching device, wherein the PID is communicatively coupled to the electronic switching device through the PWM and wherein the TCU is coupled to the PWM.

10. The DC-to-DC converter of claim 4 further comprising a supervisor communicatively coupled to the electronic switching device, wherein the PID is communicatively coupled to the electronic switching device through the supervisor and the TCU is coupled to the PID and the supervisor.

11. The DC-to-DC converter of claim 6, wherein the high side and low side switching devices are metal oxide semiconductor field effect transistors (MOSFETs).

12. The DC-to-DC converter of claim 9 wherein the TCU is configured to control the operation of the PWM.

13. The DC-to-DC converter of claim 10 wherein the signal sent by the transient controller is received by the supervisor and the supervisor uses the signal to determine a control communication used to drive the electronic switching device.

14. The DC-to-DC converter of claim 12 wherein the TCU is configured to modify a gain at the PID.

15. The DC-to-DC converter of claim 13 wherein the supervisor uses information from the PID when a transient is not present.

16. The DC-to-DC converter of claim 15 wherein the information from the PID is delivered to the supervisor from a PWM.

17. A DC-to-DC converter comprising;
an electronic switching device having a high side switch and a low side switch;
an inductor coupled to the electronic switching element;
a capacitor coupled to the inductor;
a transient control unit (TCU) communicatively coupled to the electronic switching device; and
an adaptive voltage positioning (AVP) block coupled to the TCU, wherein the TCU is configured to signal the AVP block to modify a load line resistance and discharge the capacitor to a point where ring back in an output voltage across the capacitor is eliminated in response to a transient event before turning on the high side switch in response to a transient and wherein the adaptive voltage positioning block is configured to vary an output voltage with a change in a load current.

* * * * *